United States Patent Office 2,914,021
Patented Nov. 24, 1959

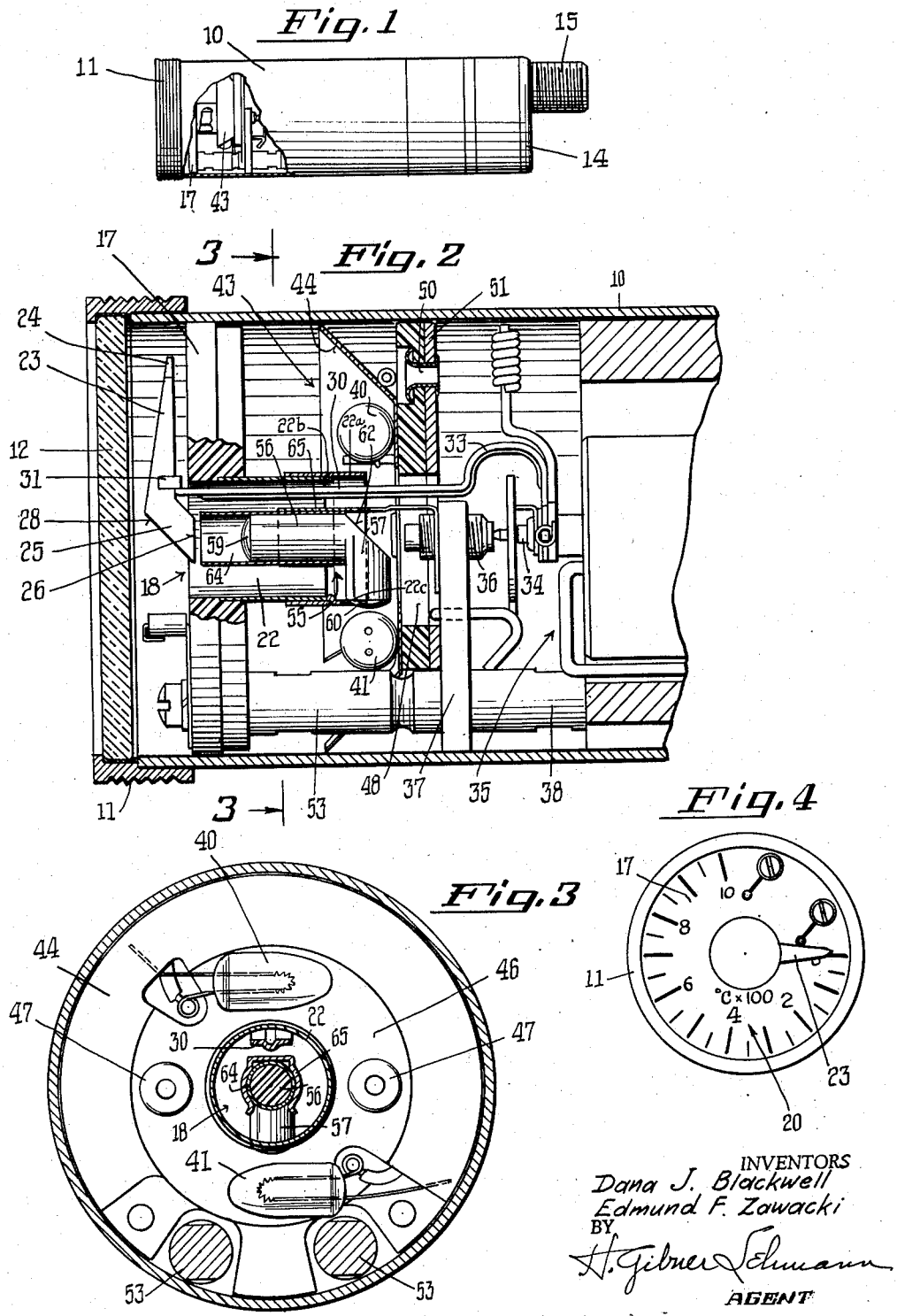

2,914,021

ILLUMINATED INDICATOR MEANS AND INSTRUMENT

Dana J. Blackwell and Edmund F. Zawacki, Naugatuck, Conn., assignors to Lewis Engineering Company, Naugatuck, Conn., a corporation of Connecticut Application April 29, 1958, Serial No. 731,829

4 Claims. (Cl. 116—129)

This invention relates to illuminated indicating instruments, and more particularly to illuminated indicator means for use with instrument movements.

The present invention constitutes a species of the generic invention illustrated and claimed in our copending application Serial No. 656,875 filed May 3, 1957, now Patent No. 2,874,671, and entitled Illuminated Meter. In this copending application there is disclosed a novel combination of illuminated dial and pointer the illumination for which is supplied by a lighting assemblage disposed at the rear of the dial. This assemblage provides light directly to the dial from the rear, and also provides light indirectly to the pointer through the intermediary of a transparent elongate light-piping member which brings light to an end of the pointer located on the axis of turning thereof. The said light for the pointer is then redirected or reflected by a reflecting surface thereon, so as to illuminate the entire length of the pointer.

In this copending application the light assembly comprises a plurality of small incandescent bulbs mounted on a transverse wall disposed within the casing of the instrument, in front of the instrument movement. Immediately adjacent the bulbs and to the rear thereof are provided two ring-like flat reflectors by means of which increased illumination was had of the dial, for a given output of light from the bulbs.

In accordance with the present invention an extremely effective and simple illumination of both the dial and the pointer is obtained by the use of a pair of miniature incandescent bulbs disposed at the rear of the dial on opposite sides of the axis thereof, through an arrangement involving novel, angularly disposed reflector means juxtaposed to the remote sides of the bulbs. In the illustrated embodiment of the invention such reflector means is in the form of an annulus and comprises a shallow flat-bottomed cup having outwardly flared side walls, between which the two incandescent bulbs are disposed. Both the bottom and the side walls of the cup are polished or made bright, and with the organization as disclosed herein there is effected a desirable and adequate lighting of the dial from the rear. Also, the light from one of the bulbs is utilized, through the medium of an angularly shaped light-piping member, to obtain an effective illumination of the pointer.

In conjunction with the above, concentrically disposed cylindrical light shields are provided, by which there is effectively prevented undesirable stray light so that optimum illumination of the pointer and dial is obtained.

Accordingly, it is one object of the invention to provide complete illumination of a dial and movable pointer in an effective and reliable manner by a structure involving a pair of incandescent bulbs located at the rear of the dial.

Another object of the invention is to provide an improved illuminated indicator means as above set forth, which is extremely compact and adapted to occupy only a very small space, thereby to adapt the said means for use with instrument movements of very small size. In the illustrated embodiment of the invention the diameter of the casing which encloses the entire instrument is only one inch, yet because of the simple and compact means provided, an adequate and reliable illumination is obtained throughout the entire range of the dial or instrument scale.

A feature of the invention resides in the provision of an improved illuminated indicator means as above set forth and having all of the mentioned advantages, which means is nevertheless extremely simple in its construction and economical to fabricate.

Other features and advantages will hereinafter appear.

In the accompanying drawings, illustrating an embodiment of the invention, similar characters of reference have been used to designate like components throughout the several views, in which:

Figure 1 is a side elevational view of a miniature, electrical indicating instrument having incorporated therein the improved illuminated indicator means of the invention.

Fig. 2 is a fragmentary axial sectional view, greatly enlarged, of the illuminated indicator means of the invention.

Fig. 3 is a transverse sectional view, taken on the line 3—3 of Fig. 2.

Fig. 4 is a front elevational view, showing the face of the dial and the front of the pointer which is movable thereover.

As shown, the indicating instrument of the invention comprises a relatively long, small-diameter cylindrical casing 10 having at its front end a bezel 11 and transparent window 12, through which the indicator means of the instrument may be viewed.

At the rear, the casing 10 has a transverse wall 14 provided with a usual type of multi-pronged separable connector fitting 15 by which electrical connections are established to the instrument.

Within the front of the casing 10, directly behind the transparent window 12 there is located a translucent circular dial 17 having a relatively large central opening 18, and having on its face indicia such as graduations and numbers 20 adapted to be illuminated by light which strikes the dial from the rear.

Extending rearward from the central opening 18 of the dial 17 there is a light-impervious cylindrical shield 22 which may be advantageously formed from a metal cylinder or tube. As already mentioned, the present illuminated indicator means is adapted for use with small instrument movements and casings therefor wherein the various parts and components are arranged in a very compact manner; in accordance with the present invention and in keeping with the small size and compact nature of the illustrated instrument, we provide on the cylindrical shell 22 a movable, light-impervious cylindrical sleeve 22a which telescopes with and is slidable over the shell 22. The sleeve 22a, during assembly of the various components, is carried by the shell 22 in a retracted or forward position wherein the front edge of the sleeve engages or is juxtaposed to the rear surface of the dial 17. However, the sleeve 22a is shiftable along the shell 22 to a rearward extended position, as shown in Fig. 2, whereby it constitutes an extension of the shell for purposes to be later brought out. Preferably the sleeve 22a has a plurality of inwardly extending nibs 22b adapted to engage the rear edge of the shell 22 so as to retain the sleeve in extended position after it has been initially shifted to such position. Also, the sleeve 22a has a cut-out 22c, for purposes to be later described.

Movable over the front surface of the dial 17 is an elongate, translucent pointer 23 tapering to a point 24 at its indicating end, said pointer having a light-receiving portion 25 at its other end, which latter is located at the axis of turning of the pointer.

The light-receiving end 25 of the pointer has a flat surface 26 which the light first strikes in illuminating the pointer, said surface being preferably disposed at right angles to the axis of turning of this member. Adjoining the light-receiving surface 26 and angularly disposed with respect thereto is a light-reflecting surface 28, said reflecting surface being adapted to redirect or reflect the light received through the surface 26, sending such light longitudinally along the pointer 23 so as to illuminate the same along its entire length.

In order to prevent the light which is being directed to the pointer 23 from undesirably illuminating the front of the dial 17, the light-receiving surface 26 is disposed in back of the plane which contains the front face of the dial, and this is an important feature of the invention, being clearly shown in Fig. 2.

The pointer 23 is movably mounted by means of an elongate actuating arm 30 which passes forwardly through the light-impervious shield 22 and is secured to the pointer by means of a clip 31 at its front end. The actuating arm 30 extends rearward and at its other extremity has a U-shaped offset portion 33 the extremity of which is secured to the movable shaft or spindle 34 of an electrical instrument movement indicated generally by the numeral 35.

As shown in Fig. 2, the spindle 34 is carried in a bearing socket 36 mounted on a transverse fixed wall 37 secured in place by a fixed post 38. By the above construction, the pointer 23 is mounted for turning movement through an arc of virtually three right angles, as clearly seen in Fig. 4 wherein this arc represents the extent of the scale on the dial 17.

In accordance with the present invention we provide a novel and improved, simple yet effective illumination means behind the dial 17, whereby the indicia 20 of the said dial and also the pointer 23 are illuminated so as to be clearly visible in the dark, and whereby the indications of the said pointer may thus be easily and accurately read. This illumination means comprises a pair of miniature incandescent electric lamps 40 and 41, disposed on their sides within a shallow, flat-bottomed reflector cup 43 having outwardly flared side walls 44 located adjacent the remote sides of the lamps 40 and 41. The maximum diameter of the flared walls 44 of the reflector cup 43 is approximately the same as that of the dial 17, both fitting snugly within the cylindrical casing 10 as shown.

The flat bottom of the reflector cup 43 is indicated at 46, said bottom being apertured to receive a pair of eyelets 47 by which the cup is secured to a transverse wall 28 of insulating material, the latter in turn being fastened by eyelets 50 to a metal mounting plate 51 which is rigidly affixed to the instrument movement 35 so as to constitute a unit therewith.

As seen in Figs. 1 and 2, the dial 17 is also affixed to the instrument movement 35 by means of a post or stud 53 aligned with the said post 38 on which the bearing plate 37 is carried.

As shown in Fig. 2, the incandescent lamps 40 and 41 are disposed closely adjacent the flat bottom 46 of the reflector cup 43, and the said bottom and also the flared sides 44 are highly polished or made bright in any other suitable manner, thereby to reflect light from the lamps 40 and 41 forwardly and against the rear surface of the dial 17. We have found that, by the provision of both the flat reflecting surface 46 and the frusto-conical sloping reflector surface 44 an appreciable amount of light is reflected forward, such reflected light augmenting the direct light from the bulbs 40 and 41 to such an extent that with only two small bulbs an adequate lighting of the dial 17 is obtained.

Further, in accordance with the present invention, light from one of the bulbs 40, 41, namely the bulb 41 is also utilized to obtain an effective illumination of the pointer 23. This is accomplished by the provision of an angle-shaped light-piping member 55, said member being of transparent plastic substance such as clear Lucite plastic, and having one leg 56 disposed within the shield 22 and concentric therewith, the member 55 having its other leg 57 extending laterally of the axis of the dial and in back of the latter to a point closely adjacent the lamp 41. Both of the legs 56 and 57 of the light piping member 55 are provided at their extremities with convex lens surfaces 59 and 60, and the member 55 also has a flat light-reflecting surface 62 by which light received by the leg 57 is redirected or reflected to the leg 56. Such reflected light will pass forwardly through the space between the lens 59 and the light-receiving surface 26 of the pointer 23 and will pass into the pointer at such point and be reflected by the surface 28 thereof, so as to illuminate the entire length of the pointer.

It will be understood that the lens surfaces 59 and 60 on the light-piping member 55 provide for collecting and concentrating the light from the bulb 41, thereby to utilize the said light most effectively and to provide the maximum degree of illumination of the pointer 23.

Surrounding the leg 56 of the light-piping member 55 we provide a cylindrical light-impervious shield 64, said shield being carried by a mounting arm 65 which passes rearward through a large center opening in the flat bottom 46 of the reflector cup 43 and is secured to the pivot screw 36 of the instrument movement. The arm 65 may be utilized as a mounting for the light-piping member 55, and by the provision of the light-impervious shield 64 stray light from the member 55 is prevented from passing laterally out through the large opening 18 in the dial 17, and undesirably illuminating the front of the dial. As seen in Fig. 2, the front edge of the light shield 64 is located close to the light-receiving surface 26 of the pointer 23, and the space between said edge and surface is disposed to the rear of the plane which contains the front face of the dial 17. By such organization there is minimized stray light which might pass forward and undesirably illuminate the front of the dial.

An important advantage of the above structure as provided by the present invention resides in the fact that concentrations of light on the rear surface of the dial 17 are largely avoided, and in consequence the lighting of the indicia 20 on the front of the dial is very uniform. We attribute this to the provision and organization of the novel cup-shaped reflector 43. Normally reflectors are designed and provided for the purpose of concentrating light, to make it more intense at a certain point. However, our improved shallow reflector 43 in conjunction with the pair of lamps 40, 41 functions to both increase the light striking the rear of the dial 17 and also to diffuse the said light and avoid bright spots on the dial. It will be noted that each one of the lamps 40, 41 provides illumination over a large area of the rear of the dial, and that such areas overlap with the overlapping occurring in zones of lesser direct illumination, located along a median line extending parallel to the axis of the lamps and midway between the lamps. For example, such median line or plane would pass through the eyelets 47. As seen in Fig. 4, this median plane or line would be horizontal, passing through the axis of turning of the pointer 23 and lying in the longitudinal axis of the casing 10. Thus, at the right and left sides of the axis of the pointer 23 there would exist the said overlapping zones of illumination. In these zones the light from one of the lamps 40, 41 augments the light from the other lamp, and the illumination is also increased by the shape and disposition of the reflector 43 having the flat, bottom reflecting surface 46 and the conical, side reflecting wall 47. We have found that the arrangement as illustrated herein employing the two widely spaced lamps in conjunction with the particular configuration of the reflector cup 43 results in a desirable and uniform illumination of virtually the entire indicia-carrying front portion of the dial 17, and this construction therefore constitutes an important feature of the invention. The cutout or notch 22c in the sleeve 22a, as clearly seen in Fig. 2, provides clearance for the radially extending portion or leg 57 of the light-piping member 55. It will be noted further that the sleeve 22a blocks light from the lamps 40, 41 and prevents such light from entering and passing through the light shield 22 to the front of the dial 17.

It will now be understood that, in accordance with the structure above set forth, we have provided an extremely simple and compact illuminated indicator means which may be made to occupy very little space, and which is characterized by dial illumination and also pointer illumination from a light source located at the rear of the dial. Only two, small miniature incandescent electric bulbs are utilized in the embodiment illustrated and the entire construction may be contained within a small cylindrical instrument casing having a diameter of 1". yet a sharp definition of the indicia on the dial and of the pointer is had for all positions of the latter, making it easy to obtain quick, accurate readings under external adverse lighting conditions. By the use of but two lamps very little heat is generated within the instrument casing, and the generated heat may be readily dissipated without adversely affecting the instrument movement or other components contained therein. The illuminated indicator means is not only small and compact, but also extremely rugged, and is reliable in its operation and able to withstand adverse conditions of use.

Variations and modifications of the invention may be made within the scope of the claims, and portions of the improvements may be used without others.

We claim:

1. An illuminated indicator means for use with an instrument movement, comprising in combination a translucent, circular dial having a center opening and having indicia adapted to be illuminated by light striking the dial from the rear; a light-impervious tubular shield extending rearward from the center opening of the dial and disposed concentrically with respect to the axis of the dial; a translucent pointer in front of the dial, having a light-receiving portion disposed at its axis of rotation and in front of the dial opening to receive light from the rear of the dial for the purpose of illuminating the pointer; an angle-shaped, transparent, light-piping member having one leg disposed within said shield and concentric therewith, and having its other leg extending laterally of the axis of the dial and in back of the latter, said shield being arranged to provide clearance for a line of sight to said other leg along the axis thereof, said member having means for passing light from one leg to the other; a pair of spaced bulbs disposed behind the dial on opposite sides of the axis thereof to directly illuminate the dial from the rear, said other leg of the light-piping member being close to, and adapted to receive light from, one of said bulbs; and angularly-disposed reflector means adjacent the remote sides of both of the said bulbs, for reflecting light from both bulbs respectively against the rear of the dial.

2. An illuminated indicator means for use with an instrument movement, comprising in combination a translucent, circular dial having a center opening and having indicia adapted to be illuminated by light striking the dial from the rear; a light-impervious tubular shield extending rearward from the center opening of the dial and disposed concentrically with respect to the axis of the dial; a translucent pointer in front of the dial, having a light-receiving portion disposed at its axis of rotation and in front of the dial opening to receive light from the rear of the dial for the purpose of illuminating the pointer; an angle-shaped, transparent, light-piping member having one leg disposed within said shield and concentric therewith, and having its other leg extending laterally of the axis of the dial and in back of the latter, said shield being arranged to provide clearance for a line of sight to said other leg along the axis thereof, said member having means for passing light from one leg to the other; a pair of spaced bulbs disposed behind the dial on opposite sides of the axis thereof to directly illuminate the dial from the rear, said other leg of the light-piping member being close to, and adapted to receive light from, one of said bulbs; and angularly-disposed reflector means adjacent the remote sides of both of the said bulbs, for reflecting light from both bulbs respectively against the rear of the dial, said reflector means comprising a truncated conical reflector having a major diameter on the order of the diameter of the dial.

3. An illuminated indicator means for use with an instrument movement, comprising in combination a translucent, circular dial having a center opening and having indicia adapted to be illuminated by light striking the dial from the rear; a light-impervious tubular shield extending rearward from the center opening of the dial and disposed concentrically with respect to the axis of the dial; a translucent pointer in front of the dial, having a light-receiving portion disposed at its axis of rotation and in front of the dial opening to receive light from the rear of the dial for the purpose of illuminating the pointer; an angle-shaped, transparent, light-piping member having one leg disposed within said shield and concentric therewith, and having its other leg extending laterally of the axis of the dial and in back of the latter, said shield being arranged to provide clearance for a line of sight to said other leg along the axis thereof, said member having means for passing light from one leg to the other; a pair of spaced bulbs disposed behind the dial on opposite sides of the axis thereof to directly illuminate the dial from the rear, said other leg of the light-piping member being close to, and adapted to receive light from, one of said bulbs; and angularly-disposed reflector means adjacent the remote sides of both of the said bulbs, for reflecting light from both bulbs respectively against the rear of the dial, said reflector means comprising a truncated conical reflector having a major diameter on the order of the diameter of the dial and an annular flat reflector attached to the inner periphery of the conical reflector and disposed adjacent and behind the said bulbs.

4. An illuminated indicator means for use with an instrument movement, comprising in combination a translucent, circular dial having a center opening and having indicia adapted to be illuminated by light striking the dial from the rear; a light-impervious tubular shield extending rearward from the center opening of the dial and disposed concentrically with respect to the axis of the dial; a translucent pointer in front of the dial, having a light-receiving portion disposed at its axis of rotation and in front of the dial opening to receive light from the rear of the dial for the purpose of illuminating the pointer; an angle-shaped, transparent, light-piping member having one leg disposed within said shield and concentric therewith, and having its other leg extending laterally of the axis of the dial and in back of the latter, said shield being arranged to provide clearance for a line of sight to said other leg along the axis thereof, said member having means for passing light from one leg to the other; a pair of spaced bulbs disposed behind the dial on opposite sides of the axis thereof to directly illuminate the dial from the rear, said other leg of the light-piping member being close to, and adapted to receive light from, one of said bulbs; and angularly-disposed reflector means adjacent the remote sides of both of the said bulbs for reflecting light from both bulbs respectively against the rear of the dial, said reflector means comprising a shallow, flat-bottomed cup having a central aperture and having outwardly flared side walls; and a movable, pointer mounting means passing through said central aperture and through the said cylindrical light shield.

References Cited in the file of this patent

UNITED STATES PATENTS

| | | |
|---|---|---|
| 2,035,998 | Thompson | Mar. 31, 1936 |
| 2,189,535 | Stuerzl | Feb. 6, 1940 |
| 2,218,074 | Smith | Oct. 15, 1940 |
| 2,287,605 | Dickson | June 23, 1942 |
| 2,648,305 | Appleman | Aug. 11, 1953 |
| 2,681,977 | Ballard | June 22, 1954 |